United States Patent
Guenter et al.

(10) Patent No.: US 8,150,462 B2
(45) Date of Patent: *Apr. 3, 2012

(54) CONNECTION BOX

(75) Inventors: Klaus Guenter, Aichbalden (DE); Thomas Deck, Wolfach (DE); Josef Fehrenbach, Haslach (DE)

(73) Assignee: VEGA Grieshaber KG, Wolfach (DE)

( * ) Notice: Subject to any disclaimer, the term of this patent is extended or adjusted under 35 U.S.C. 154(b) by 1122 days.

This patent is subject to a terminal disclaimer.

(21) Appl. No.: 11/935,667

(22) Filed: Nov. 6, 2007

(65) Prior Publication Data

US 2008/0125175 A1 May 29, 2008

Related U.S. Application Data

(60) Provisional application No. 60/861,232, filed on Nov. 27, 2006, provisional application No. 60/861,233, filed on Nov. 27, 2006, provisional application No. 60/861,234, filed on Nov. 27, 2006.

(30) Foreign Application Priority Data

Nov. 27, 2006 (DE) .......................... 10 2006 055 897
Nov. 27, 2006 (DE) .......................... 10 2006 055 898
Nov. 27, 2006 (DE) .......................... 10 2006 055 900

(51) Int. Cl.
*H04B 1/38* (2006.01)

(52) U.S. Cl. .......... 455/557; 455/3.01; 455/9; 455/11.1; 455/13.1; 455/41.2; 455/41.3; 455/90.1; 455/418; 455/419; 455/420; 455/423; 455/424; 455/425; 455/466; 370/310.2; 370/338; 310/323.21; 710/15; 710/72; 700/83

(58) Field of Classification Search ................. 455/3.01, 455/418–420, 423–425, 9, 11.1, 13.1, 466, 455/41.2, 41.3, 557, 90.1; 370/310.2, 338; 310/323.21; 710/15, 72; 700/83
See application file for complete search history.

(56) References Cited

U.S. PATENT DOCUMENTS

| | | |
|---|---|---|
| 6,285,966 B1 | 9/2001 | Brown et al. |
| 6,304,934 B1 | 10/2001 | Pimenta et al. |
| 6,738,856 B1 | 5/2004 | Milley et al. |
| 2002/0060627 A1 | 5/2002 | Gaiser |
| 2003/0102766 A1* | 6/2003 | Adachi et al. ................. 310/232 |
| 2004/0030532 A1 | 2/2004 | Boldt et al. |
| 2004/0183550 A1 | 9/2004 | Fehrenbach et al. |
| 2005/0033886 A1 | 2/2005 | Grittke et al. |
| 2005/0092356 A1 | 5/2005 | Sakai |
| 2005/0245291 A1 | 11/2005 | Brown et al. |

(Continued)

FOREIGN PATENT DOCUMENTS

AT 006011 2/2003

(Continued)

*Primary Examiner* — Steve D Agosta
(74) *Attorney, Agent, or Firm* — Fay Kaplun & Marcin, LLP

(57) ABSTRACT

Field devices for measuring a pressure or a fill level are connected, by way of a cable connection or a radio connection, to stationary evaluation- and display devices. To provide flexible parameterization or flexible measured-value inquiry, a connection box for the wireless transmission of signals between the field device and the control device is stated, which connection box comprises an interface connection and a radio interface. For the purpose of transmitting the signals, the interface connection and the radio interface are coupled to each other so as to be able to communicate.

24 Claims, 13 Drawing Sheets

U.S. PATENT DOCUMENTS

| | | |
|---|---|---|
| 2006/0192671 A1 | 8/2006 | Isenmann et al. |
| 2007/0191974 A1* | 8/2007 | Staiger .......................... 700/83 |
| 2008/0114911 A1* | 5/2008 | Schumacher ................... 710/72 |
| 2008/0211664 A1 | 9/2008 | Griech et al. |

FOREIGN PATENT DOCUMENTS

| | | |
|---|---|---|
| DE | 19522937 | 1/1996 |
| DE | 101 44 971 | 3/2003 |
| DE | 10 2004 020 393 | 11/2005 |
| DE | 10 2005008488 | 9/2006 |
| EP | 1 211 582 | 6/2002 |
| EP | 1293853 | 3/2003 |
| EP | 1 524 506 | 4/2005 |
| WO | 02/37061 | 5/2002 |
| WO | 2006/089760 | 8/2006 |

\* cited by examiner

CONNECTION BOX

REFERENCE TO RELATED APPLICATIONS

This application claims the benefit of the filing date of German Patent Applications Serial Nos. 10 2006 055 897.9 filed 27 Nov. 2006, 10 2006 055 898.7 filed 27 Nov. 2006 and 10 2006 055 900.2 filed 27 Nov. 2006; and U.S. Provisional Patent Applications Nos. 60/861,232 filed 27 Nov. 2006, 60/861,233 filed 27 Nov. 2006 and 60/861,234 filed 27 Nov. 2006, the disclosure of which applications is hereby incorporated herein by reference.

FIELD OF THE INVENTION

The present invention relates to the technical field of fill level measuring and pressure measuring. In particular, the present invention relates to a connection box for the wireless transmission of a signal between a field device and a control device, to the use of a connection box for fill level measuring or pressure measuring, and to the wireless transmission of a signal between a field device and a control device, and to a method for wireless transmission of a signal between a field device and a control device with a connection box.

BACKGROUND INFORMATION

For the purpose of measuring the fill level of liquids and solids in containers, a fill-level measuring device is usually installed at or in the container wall. The fill-level measuring device subsequently transmits waves, either in a guided manner through a waveguide, or in a radiated manner by way of an antenna device of the product. Subsequently, the waves reflected by the product are received by the measuring device. From the transit time that can be determined therefrom, the distance between the sensor and the product results, and from the knowledge of the relative position of the sensor from the container bottom, the sought fill height can be derived.

The measured data, if applicable after buffer storage and/or initial evaluation, is transmitted to a control- or evaluation device. The device may also simply be a display device. As a countermove to the above, the field devices may be parameterised or triggered (i.e. to cause a measuring operation) by way of the control device. This bi-directional data exchange may require data transmission paths, by way of which the field devices are coupled to the control devices, read-out devices or display devices.

As a rule, the individual components of field device and evaluation-/display device or control device may be installed so as to be fixed. The field device is, for example, located on the cover of a high product container and is connected, by way of a data cable, to an evaluation-/display unit or control device arranged in a control room. Device parameterisation or reading the measuring data is thus only possible directly on the field device or in the control room.

SUMMARY OF THE INVENTION

According to an exemplary embodiment of the present invention, a connection box for the wireless transmission of a signal between a field device and a control device is stated, with the connection box comprising a radio interface for the wireless transmission of a transmit signal to the field device, or for the wireless reception of a receive signal from the field device, and an interface connection for connecting the connection box to an interface adapter, wherein, for the purpose of transmitting the receive signal from the radio interface to the interface connection, the radio interface and the interface connection are coupled to each other so as to be able to communicate, and wherein the field device is a fill-level measuring device or a pressure measuring device.

This may provide flexible communication between a field device and a mobile control device. In other words, a connection box is stated which on the one hand can access the radio link between the field device and the control device, and which on the other hand can be connected, by way of a corresponding interface adapter, for example to a read-out device such as a laptop or some other mobile device, or may be connected to a control device or parameterisation device. The interface adapter may, for example, be used to convert the measuring signal from the field device to a USB signal. Of course, depending on the design of the interface adapter, conversion to some other signal format may also take place.

In this way the data line (radio link) between the field device and the evaluation-/display device or a control unit may be tapped in order to make possible communication or data exchange with the field device on site. A service technician then need not first climb the tank or go to the control room, for example in order to carry out field device parameterisation or in order to call up measuring data. Instead, by means of the small connection box, which may be designed in different sizes and shapes and can, for example, easily be carried in a shirt pocket, said service technician may in a simple manner directly tap into the data path between the field device and the control room.

It should be noted that there may be no need to provide a control room with corresponding devices. Instead, it may be possible for the connection box with the interface connection and its radio interface to provide the sole communication path between the field device and a control device or read-out device or evaluation device.

For example, radio communication takes place by way of WLAN (Wireless Local Area Network), ISM (which provides an extended range of approximately one kilometer), Bluetooth or ZIGBEE. Other transmission protocols may also be possible.

According to a further exemplary embodiment of the present invention, the signal is selected from the group comprising a HART signal, an $I^2C$ signal, a Profibus signal, a Fieldbus foundation signal, a 4 . . . 20 mA signal and a switching signal.

Thus if the field device communicates with the outside world by way of one of the above-mentioned signals, the connection box may be connected to the signal path (i.e. it can tap said signal path). The interface connection of the box then may make possible a continuing connection (by way of an interface), for example to a PC or to a laptop (for example by way of a USB interface).

According to a further exemplary embodiment of the present invention, the radio interface is an internal interface within the connection box.

The radio interface is, for example, integrated within the housing of the connection box. In this case it may thus be sufficient to merely carry the connection box along. There may be no need to carry along an external radio interface.

According to a further exemplary embodiment of the present invention, the radio interface comprises an antenna of predeterminable antenna characteristics. By means of predeterminable antenna characteristics the transmission behaviour may be matched to the radio interface. Predeterminable antenna characteristics may, for example, be achieved by means of an antenna array, wherein the antenna characteristics can be electronically controlled. It is thus possible, for example, to direct the radiation in a particular direction. In this way the range of a radio signal can be increased. By means of predeterminable antenna characteristics it is also possible to create so-called radio cells. This means that regions in which different radio frequencies are used may be separated from each other. In this way small cells may be created, and thus more bandwidth may be provided relative to an overall area.

Furthermore, according to a further exemplary embodiment of the present invention, the radio interface may comprise a power limitation device. The radio interface may, for example, be implemented by means of a radio module. Due to legal provisions it may be necessary to reduce the transmission output of the radio module. Furthermore, it may be necessary to reduce the transmission output of a radio interface in order to be able to prevent overshooting and interference between various radio modules. Power limitation may be predeterminable. By means of predeterminable power limitation the transmission output of the radio module may be set without this requiring the use of different hardware.

According to a further exemplary embodiment of the present invention, the radio interface is designed to transmit or receive predeterminable frequencies of 900 MHz or 2.4 GHz. As a result of the predeterminable frequency, it is possible to switch between different frequencies. In this way it is also possible to flexibly match the radio module to legal provisions that are to be met. For example, radio transmission technologies such as WLAN or Bluetooth utilise the ISM (Industrial, Scientific and Medical) band for the transmission of data. The ISM band can be utilised for industrial, scientific or medical applications without a license. The 2.4 GHz band has been released worldwide for industrial, scientific and medical applications.

Of course, the radio interface may also be designed for transmitting or receiving other predeterminable frequencies. For example, the radio interface can, in particular, be designed for the transmission of more than two predeterminable frequencies, for example three or four predeterminable frequencies.

It may then be possible to change between these frequencies.

Furthermore, according to a further exemplary embodiment of the present invention, the connection box comprises a field device connection, which is designed to connect the box to the field device, wherein, for the purpose of transmitting the signal, the field device connection and the interface connection are coupled together so as to be able to communicate.

Thus the connection box is designed both for the wireless and for the wire-bound transmission of signals between field devices and control units or display units. In this way a flexible module may be provided which can be flexibly applied in field use.

According to a further exemplary embodiment of the present invention, the field device connection is designed to connect to a HART line.

Furthermore, according to a further exemplary embodiment of the present invention, for connection to the HART line, the field device connection of the connection box comprises a HART cable with two connectors.

By means of the two connectors the HART cable may be tapped. As an alternative, the signal may also be tapped directly on the field device or directly on the evaluation unit in the control room.

In this way extremely flexible access to the signal line may be provided for parameterisation or for read-out from the field device.

According to a further exemplary embodiment of the present invention, the field device connection is designed to connect to an $I^2C$ bus.

According to a further exemplary embodiment of the present invention, for connection to the $I^2C$ bus the field device connection comprises an $I^2C$ bus cable.

For example, according to a further exemplary embodiment of the present invention, the box can comprise both the HART cable and the $I^2C$ bus cable.

$I^2C$ or I2C or IIC (denoting Inter-Integrated Circuit) is a serial bus for computer systems. It can, for example, be used to connect devices to an embedded system or to a main board.

The HART protocol (Highway Addressable Remote Transmitter) may in particular be referred to as an open master-slave protocol for bus-addressable field devices. It can implement a method of transmitting data by means of frequency shift keying (FSK), superimposed on the 4 . . . 20 mA process signal in order to make remote configurations and diagnostic monitoring possible.

Both $I^2C$ and HART are suitable as protocols for communicating with a field device, e.g. with a fill-level measuring device or with a pressure measuring device.

A HART signal that corresponds to the HART protocol is a digital signal for transmitting measured values and/or parameters. The digital HART signal is modulated onto a 4 . . . 20 mA signal. Consequently the digital signal can be transmitted parallel to the analog 4 . . . 20 mA signal. If such parallel transmission of analog and digital signals takes place, only one field device may be connected to a HART bus.

On the other hand in a so-called multi-drop mode up to 15 digital field devices may be connected to a HART bus. In this arrangement the analog current is essentially set to 4 mA. In multi-drop mode the field devices exchange a digitally coded signal. The digital signal is a frequency-modulated signal, wherein the frequency-modulated signal can, for example, be at the two frequencies of 1200 Hz and 2200 Hz.

Any type of measuring devices, for example fill-level measuring devices, pressure measuring devices, level-detection measuring devices or temperature measuring devices, to name but a few examples, may be field devices in the sense of this application. Various physical effects can be exploited for acquisition. Measured-value acquisition can take place by means of radar rays, ultrasound, vibration, guided microwave (TDR, time domain reflection) or capacitive effects.

According to a further exemplary embodiment of the present invention, the interface connection is designed to connect the box directly to a display- and control device.

According to a further exemplary embodiment of the present invention, the display- and control device is a PLIC-SCOM device made by VEGA.

The PLICSCOM device can be removed from the box and may make possible both field device parameterisation and read-out and storage of the received measuring signals.

The display-/control device may thus provide a man-machine interface for the field device. By way of the display-/control device a user may parameterise the field device or can have received values displayed. Furthermore, the display- and control device can, for example, also be switched between the operating states of the field device.

According to a further exemplary embodiment of the present invention, the field device connection comprises an adapter connector for connection to a series 50 device made by VEGA.

It may thus also be possible to connect older devices to the box.

According to a further exemplary embodiment of the present invention, the adapter connector is coded such that incorrect connection of the adapter connector to the series 50 device is prevented. For example, based on plug codification, the plug cannot be plugged in so as to be rotated by 180°. Corresponding codification can be located on the other side of the connector, which side connects the connector with the I²C cable of the connection box.

According to a further exemplary embodiment of the present invention, the connection box is designed for signal transmission from the control device to the field device, wherein the signal comprises parameterisation data for parameterising the field device.

According to a further exemplary embodiment of the present invention, the connection box is designed for transmitting the signal from the field device and from the control device, wherein the signal comprises measuring data of the field device.

Thus the box may make possible flexible parameterisation of the field devices or flexible read-out of measured values.

According to a further exemplary embodiment of the present invention, the connection box comprises an energy supply for self-sufficient supply of electrical energy to the interface adapter.

The energy supply may, for example, be a battery. Moreover, according to a further exemplary embodiment of the invention, a rechargeable battery may be provided which is either externally rechargeable or, for example, is coupled to a solar cell module of the connection box. In this way the rechargeable battery can be charged when there is incoming light radiation, without this necessitating an external energy supply. This embodiment is particularly suitable for use in areas in which for extended periods it is not possible to depend on an energy supply for charging the rechargeable battery.

According to a further exemplary embodiment of the present invention, the connection box comprises a hollow space, which is accessible from the outside, which hollow space is designed to accommodate a HART cable, an I²C bus cable, a USB cable and an adapter connector.

For example, the connection box is designed so that it can be hinged open; in its interior it comprises corresponding holding devices, for example hook and loop type fasteners or rubber bands by means of which the cables can be fixed. By hingeing the connection box closed the cables are protected against external influences such as humidity and the like. On site, a service technician can then simply hinge the connection box open and take the corresponding cable out in order to tap the data line.

According to a further exemplary embodiment of the present invention, the interface connection comprises sliding contacts for connecting the box to the interface adapter.

In this way the interface adapter may be connected to the interface connection by means of a simple screw motion.

According to a further exemplary embodiment of the present invention, the connection box comprises a second interface connection for connecting the box to a control device. Thus apart from the interface adapter, which may make possible communication with, for example, a laptop or a PC, an additional control- or read-out device or a storage device for data backup can be connected directly to the box.

According to a further exemplary embodiment of the present invention, the use of a connection box for fill level measuring or pressure measuring and for the wireless transmission of a signal between a field device and a control device is stated, wherein the field device is a fill-level measuring device or a pressure measuring device.

Furthermore, a method for the wireless transmission of a signal between a field device and a control device with a connection box is stated, in which method the box is connected to an interface adapter, and wireless transmission of a transmit signal from a radio interface of the connection box to the field device or wireless receiving of a receive signal from the field device takes place in the radio interface, wherein the field device is a fill-level measuring device or a pressure measuring device.

A method according to a further exemplary embodiment of the invention comprises the additional step of transmitting the receive signal from the radio interface to the interface connection and then onwards to the control device.

In this way, a measured-value inquiry may take place by way of the connection box.

According to a further exemplary embodiment of the invention, the method comprises the additional step of transmitting the transmit signal from the control device to the interface connection and then to the radio interface.

In this way it may, for example, be possible to trigger parameterisation of the field device externally by way of the connection box, or it is possible for measuring to be triggered.

Below, preferred exemplary embodiments of the present invention are described with reference to the figures.

DETAILED DESCRIPTION

Figure 1:
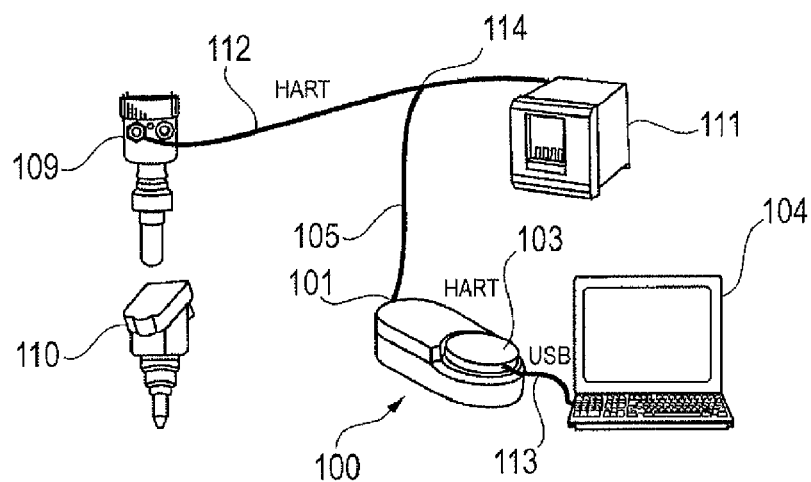
FIG. 1 shows a first application of the connection box according to an exemplary embodiment of the present invention.

The illustrations in the figures are diagrammatic and not to scale.

In the following description of the figures the same reference characters are used for identical or similar elements.

FIG. 1 shows a diagrammatic view of a first application of the connection box according to an exemplary embodiment of the present invention. The connection box 100 comprises a field device connection 101 for connecting the box 100 to the field device 109. Connection of the box 100 to the field device 109 can, for example, take place directly on the field device or on the data cable 112, for example in the form of a tapping point 114. For this purpose a connecting cable 105 is provided (see FIGS. 22 and 23).

The data line 112 between the field device 109 and the evaluation- and display device 111 is a so-called HART cable. To this effect the HART connecting cable 105 comprises, for example, two connectors or terminals, by way of which coupling to the data cable 112 becomes possible. The evaluation-/display device 111 is, for example, arranged in the control room and is used, among other things, to supply energy. At the top of the field device 109 an additional display device can be affixed. This is, for example, a so-called PLICSCOM device from the manufacturer VEGA.

Tapping or coupling the data line 112 can also take place on the supply device (parallel to the HART cable 112). By way of the connecting line 105, bi-directional data exchange is possible. The field device can thus on the one hand be parameterised. On the other hand, measuring values can be read out. Of course, connection to further field devices 110 is also possible.

Parameterisation of the HART sensor 109 takes place by way of the HART lines 112, 105, for example with PACTware. PACTware is manufacturer-independent and field-bus-independent software for operating field devices. The connection box 100 is used as a mechanical adapter between the HART line 112 and a control unit 104. The control unit 104 is, for example, a personal computer (PC), or a laptop, a PDA, a mobile phone, or some other communication device. The control unit 104 can be the only control unit, or it can serve as an alternative to the device 111. For communication between the field device 109 and the control unit 104 a USB line 113 is provided, which connects the control unit 104 to an interface adapter 103. The interface adapter 103 is connected to the interface connection 102 (see FIG. 15) of the connection box.

Measured value transmission may take place either in an analog manner (in other words 4 . . . 20 mA) or in a digital manner in the so-called multi-drop method.

Figure 2:
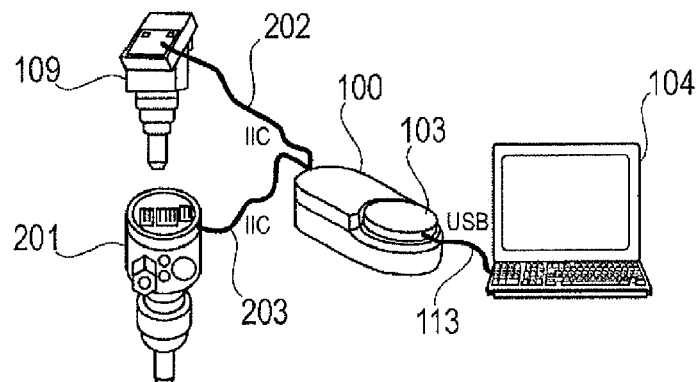
FIG. 2 shows a second application of the connection box according to a further exemplary embodiment of the present invention.

FIG. 2 shows a second application of the connection box according to a further exemplary embodiment of the present invention. In this arrangement the connection box 100 is connected directly to the field devices 109, 201 by way of corresponding I²C lines 202, 203. The device 201 is, for example, a field device, onto which the interface adapter 103 cannot be placed directly (for example a series 50 device manufactured by VEGA). For this arrangement an adapter connector 108 (see FIGS. 15 and 16) is used. The adapter connector 108 makes it possible to couple the I²C line 203 of the connection box 100 directly to the device connection of the series 50 device 201. In the case of other devices an interface adapter can be placed directly on the field device interface, on which interface adapter the USB cable 113 may then be plugged in.

The interface adapter 103 is, for example, connected to the field device 201 by way of the connection box 100 and the I²C socket of the field device 201. The length of the I²C cable 201 can be up to 25 m. Of course, the cable may also be longer.

It is also possible to plug the interface adapter directly onto the sensor without the use of a data cable. However, the use of the data cable is advantageous, for example, in situations where the field device is not readily accessible or is accessible only with increased effort, for example because said field device is located up high or far away.

Figure 3:
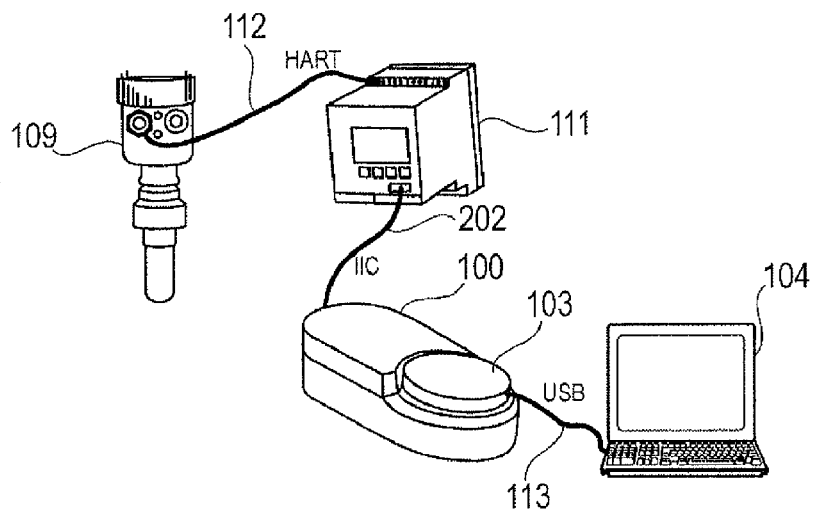
FIG. 3 shows a third application of the connection box according to a further exemplary embodiment of the present invention.

FIG. 3 shows a third application of the connection box according to a further exemplary embodiment of the present invention. A field device 109 is provided, which communicates with a supply- and control device 111 by way of a HART line 112. Several field devices (for example up to five field devices) can be connected in parallel to the supply- and control device 111. The supply- and control device 111 comprises, for example, a so-called SPC function (stored-program control) and is internet-capable.

The device 111 is, for example, a MET by the manufacturer VEGA. The connection box 100 is connected to the supply- and control device 111 by way of the I²C line 202 and may on the one hand be used for the parameterisation of the supply- and control device 111, and on the other hand for accessing or querying the sensor 109.

Parameterisation of the sensor 109 may also be possible. For this purpose the connection box 100 is connected to a laptop 104 or to some other communication device or input/output device by way of the interface adapter 103 and the USB line 113.

Figure 4:
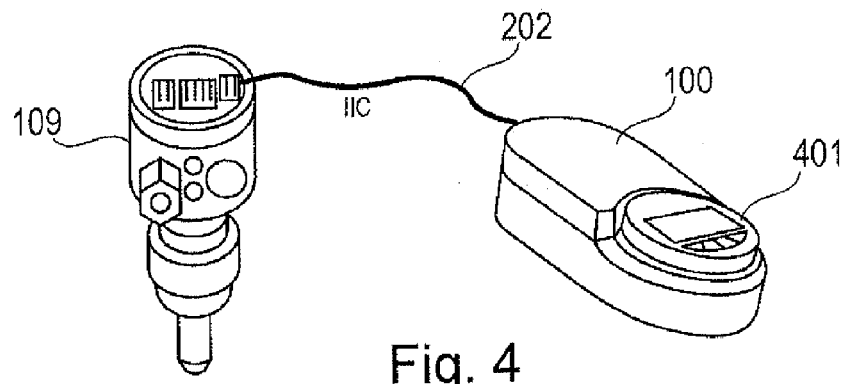
FIG. 4 shows a fourth application of the connection box according to a further exemplary embodiment of the present invention.

FIG. 4 shows a fourth application of the connection box according to a further exemplary embodiment of the present invention. As shown in FIG. 4, the connection box 100 is connected to the fill level sensor 109 by way of an I²C line 202. A display- and control device 401 is installed directly on the connection box 100, i.e. connected at the interface connection 102. In this way a separate, mobile control unit may be provided.

In the case of a self-sufficient energy supply of the display- and control device 401, for example by means of a battery within the connection box 100, connection to a HART output of the field device 109 may also be possible.

Figure 5:
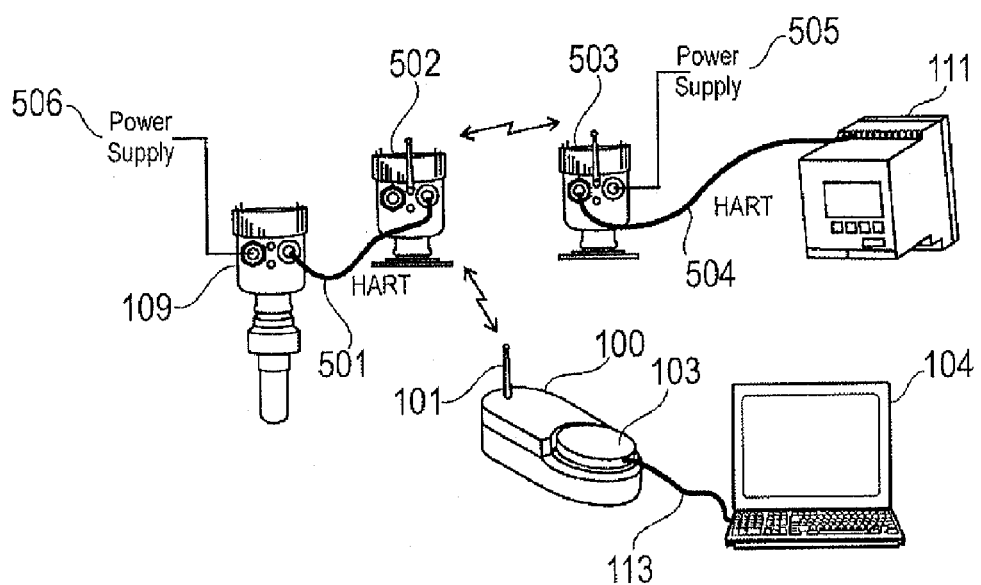
FIG. 5 shows a fifth application of the connection box according to a further exemplary embodiment of the present invention.

FIG. 5 shows a fifth application of the connection box according to a further exemplary embodiment of the present invention. This is a wireless radio transmission for parameterisation of the sensor 109. For this purpose the sensor 109 is connected, by way of the HART line 501, to a radio module 502 that is connected to an energy supply 506, and thus supplies the sensor 109 with energy. The radio module can wirelessly communicate with a second radio module 503. The second radio module 503 also comprises an energy supply 505 and is connected to the supply- and control device 111 by way of a HART line 504.

Apart from the interface adapter 103 the connection box 100 comprises a data cable 113, by way of which said connection box 100 is connected to the laptop 104. Furthermore, the connection box 100 comprises a radio interface 101 for wirelessly transmitting signals between the box 100 and the field device 109. In this way it is possible to access the radio link between the field device radio unit 502 and the radio unit 503 on the control side or evaluation side, for example in order to parameterise the field device 109.

Figure 6:
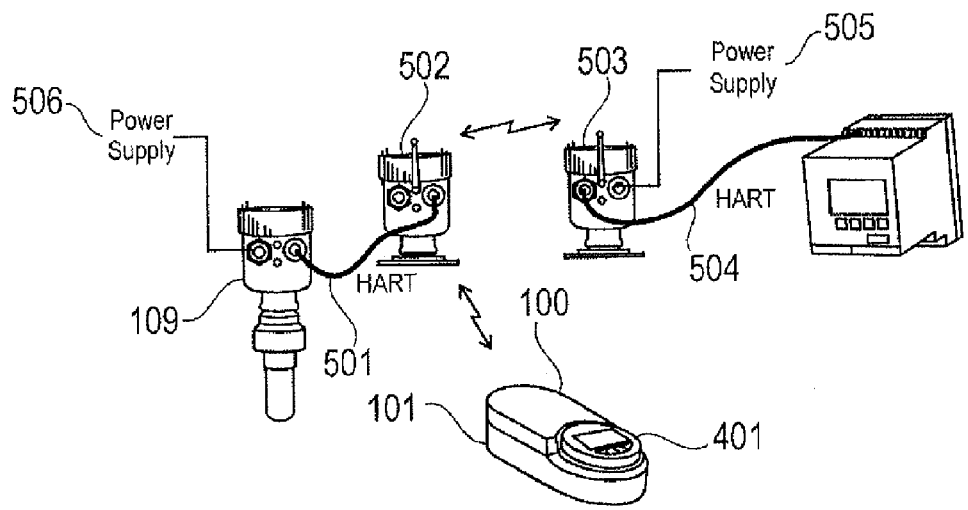
FIG. 6 shows a sixth application of the connection box according to a further exemplary embodiment of the present invention.

FIG. 6 shows a sixth application of the connection box according to a further exemplary embodiment of the present invention. Here again wireless data transmission is provided. The connection box 100 comprises an internal power supply in the form of a battery, a rechargeable battery or an external energy supply. Connection to a PC or the like is not required because the connection box is connected to the display- and control module 401.

Figure 7:
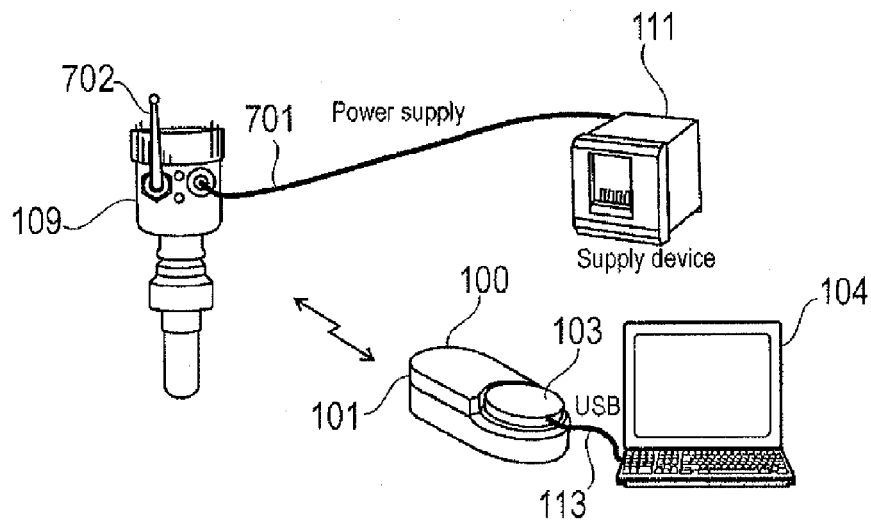
FIG. 7 shows a seventh application of the connection box according to a further exemplary embodiment of the present invention.

FIG. 7 shows a further application of the connection box according to an exemplary embodiment of the present invention. In this embodiment a radio module 702 is integrated in the sensor 109. Furthermore, the sensor 109 is connected to a supply device 111 by way of a supply line 701, for example by way of a HART line.

Parameterisation of the sensor 109 takes place wirelessly by means of the connection box 100, in which a corresponding radio module has also been integrated.

Figure 8:
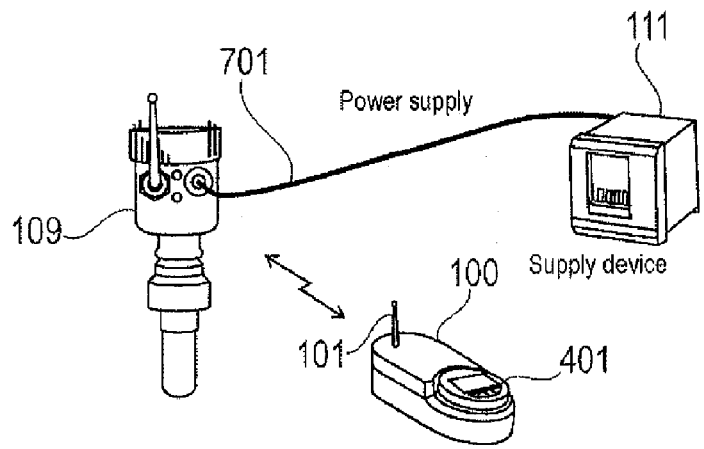
FIG. 8 shows an eighth application of the connection box according to a further exemplary embodiment of the present invention.

FIG. 8 shows a further application of the connection box according to a further exemplary embodiment of the present invention. There is no need to provide a laptop 104 or the like because the connection box 100 is coupled to the display- and control device 401. The energy supply of the connection box is by way of a battery or from an external source. In this embodiment too, both the sensor and the connection box 100 comprise a radio module.

Figure 9:
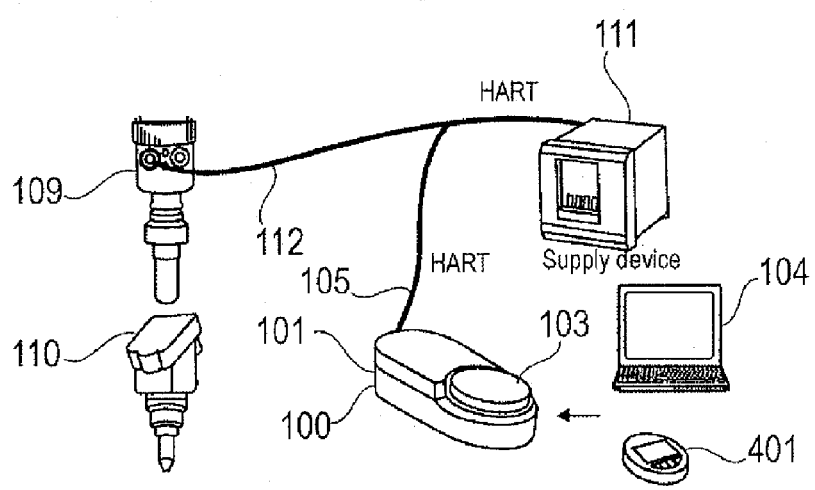
FIG. 9 shows a ninth application of the connection box according to a further exemplary embodiment of the present invention.

FIG. 9 shows a ninth application according to a further exemplary embodiment of the invention. As shown in FIG. 9, the connection box 100 is connected to the HART line 112 between the supply device 111 and the sensor 109 by way of the HART cable 105. The connection box 100 comprises an internal energy supply so that the analog measured value (analog current value) is not falsified. As an alternative to the analog measured-value signal the multi-drop mode (bus-capable) can be used. In this case no internal energy supply of the connection box or of the interface adapter 103 is necessary. The interface adapter 103 initiates sensor data recording of the sensor 109. Furthermore, a storage medium is provided which is either located within the connection box 100 or forms part of the interface adapter 103. An external storage medium can also be connected. In this way sensor data can be recorded by way of the connection box 100. Data recording can, for example, be arranged by way of a laptop 104 or a control device 401 in relation to, for example, the starting point, end point and recording intervals. The data recorded by way of the connection box 100 can subsequently be read-out, for example, by way of a USB device.

Figure 10:
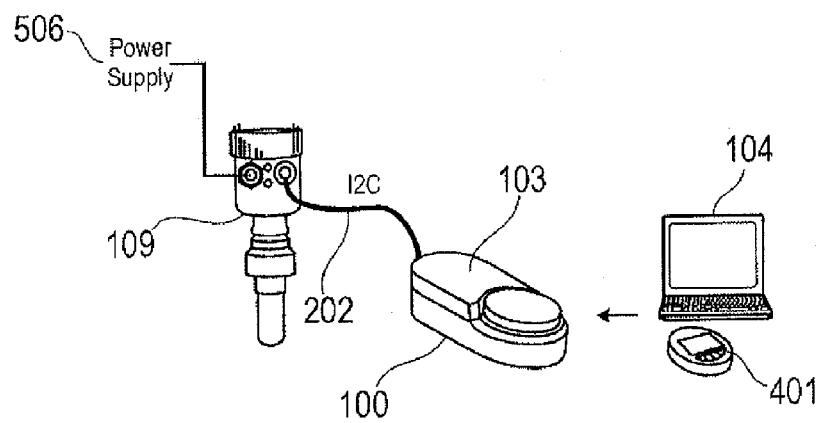
FIG. 10 shows a tenth application of the connection box according to a further exemplary embodiment of the present invention.

FIG. 10 shows a further application of the connection box according to a further exemplary embodiment of the present invention. In this embodiment the interface adapter 103 is connected to the sensor 109 by way of an I²C line 202, with the sensor 109 again being connected to an energy supply 506. The interface adapter 103 initiates sensor data recording. Furthermore, the sensor supplies energy to the interface adapter 103. Here again, an internal or external storage medium is provided in order to record the sensor data. This can, for example, be a USB memory stick. The storage medium is, for example, integrated in the connection box or in the interface adapter 103. Here again, recording is arranged by way of a laptop or the like 104 or by way of the control device 401. Reading out the recorded data takes place, for example, by way of the USB connection of the interface adapter 103.

Figure 11:
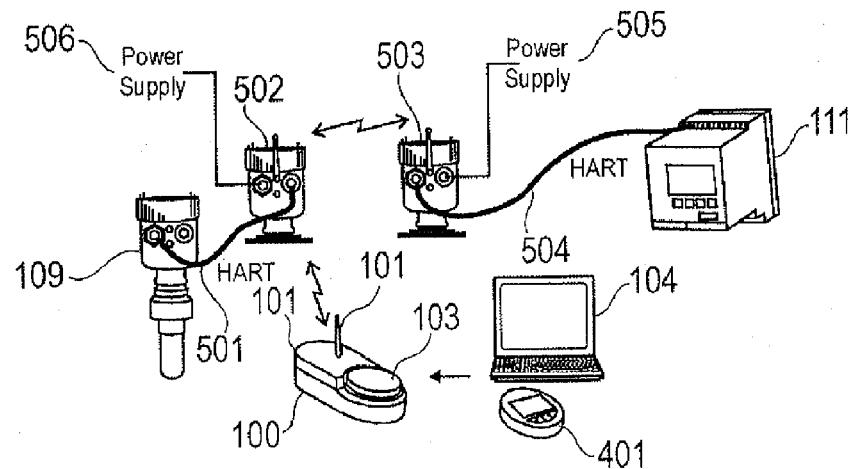
FIG. 11 shows an eleventh application of the connection box according to a further exemplary embodiment of the present invention.

FIG. 11 shows a further application of the connection box according to a further exemplary embodiment of the present invention. This involves a radio transmission as already described in FIGS. 5 to 8. The interface adapter 103 is a radio module 502 arranged in the connection box 100 and is connected to the sensor 109. The interface adapter 103 initiates sensor data recording and is supplied with energy by a battery, a rechargeable battery or an external supply device. Again an internal or external storage medium is provided in order to record the sensor data. Arranging the recording process takes place in the same way as in the cases of FIGS. 9 and 10.

Figure 12:
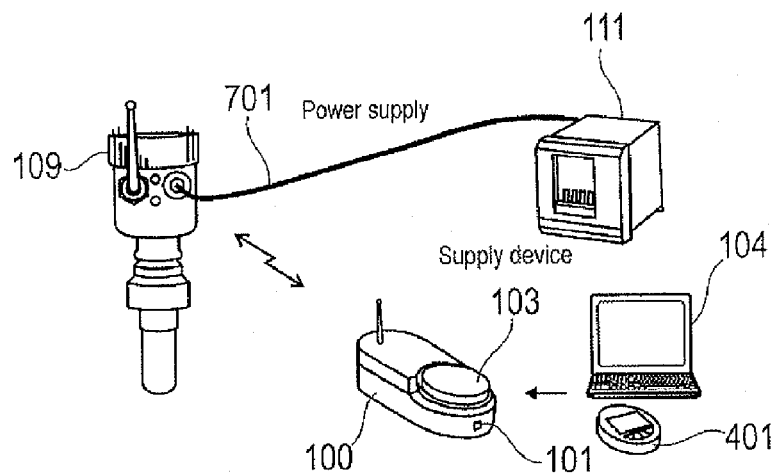
FIG. 12 shows a twelfth application of the connection box according to a further exemplary embodiment of the present invention.

FIG. 12 shows a further exemplary embodiment of an application of a connection box. Wireless communication between the connection box 100 and the sensor 109 corresponds to the case described in FIG. 7. Here again the interface adapter 103 initiates sensor data recording and is supplied with energy by a battery, a rechargeable battery or externally by a supply device 111. For the purpose of recording sensor data, in this embodiment too, a storage medium is integrated in the connection box or in the interface adapter 103 or is externally connected. In this embodiment, too, the laptop 104 or the control unit 401 is used to arrange data recording and to read out the stored data.

Figure 13:
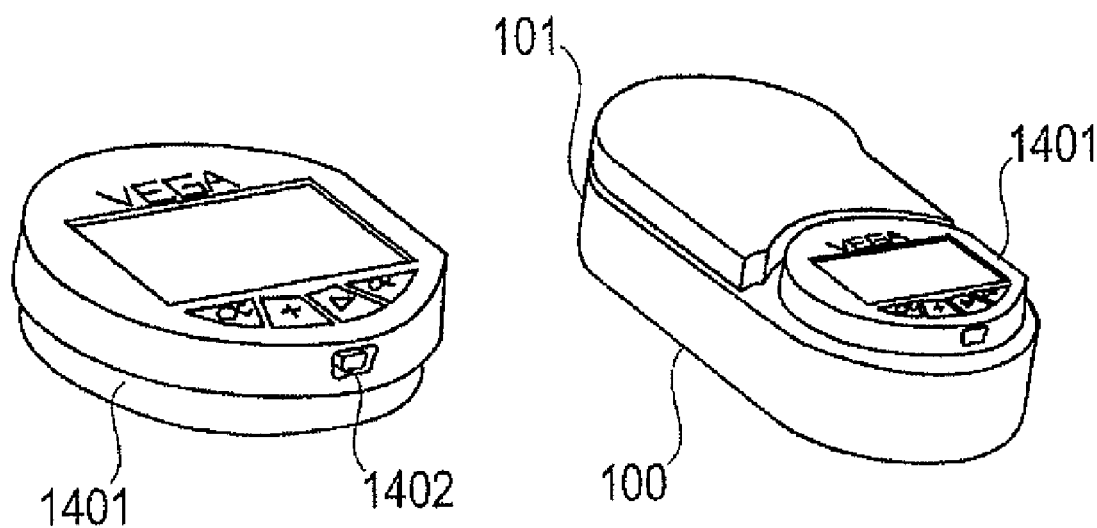
FIG. 13 shows a thirteenth application of the connection box according to a further exemplary embodiment of the present invention.

FIG. 13 shows a further application of the connection box according to a further exemplary embodiment of the present invention. For this purpose the connection box 100 is designed such that a combined control- and communication unit 1401 can be connected to the interface connection 102 (see FIG. 15). The combined control- and communication unit 1401 is a combination comprising a control unit 401 and an interface adapter 103. Reference character 1402 shows the USB connection.

As a result of the combination comprising a control unit and a communication unit, operation or control of the sensor can be effected from the connection box 100, with the option, at the same time, of connecting the connection box to a laptop, for example in order to read out data.

Figure 14:
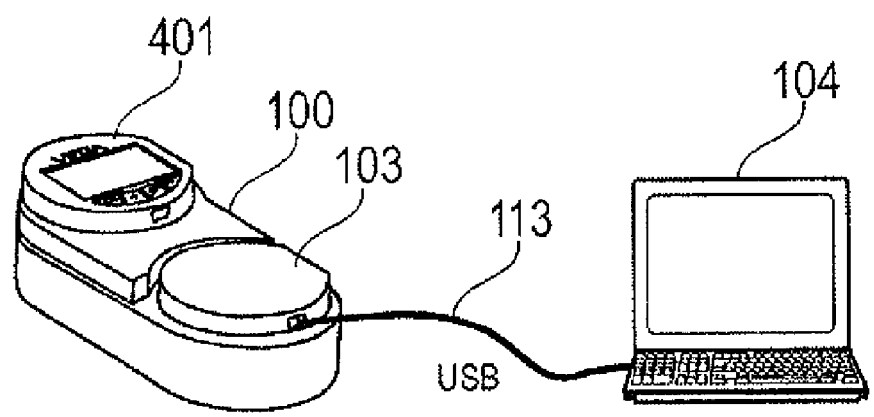
FIG. 14 shows a fourteenth application of the connection box according to a further exemplary embodiment of the present invention.

FIG. 14 shows a further application of the connection box according to a further exemplary embodiment of the present invention. The connection box 100 comprises a second interface connection, to which the control unit 401 can be connected, which second interface connection can also be used for data storage. The measuring data can thus be buffered in the control unit 401, and subsequently reading out the measuring data by way of the interface adapter 103 can be carried out by the read-out unit 104.

Figure 15:
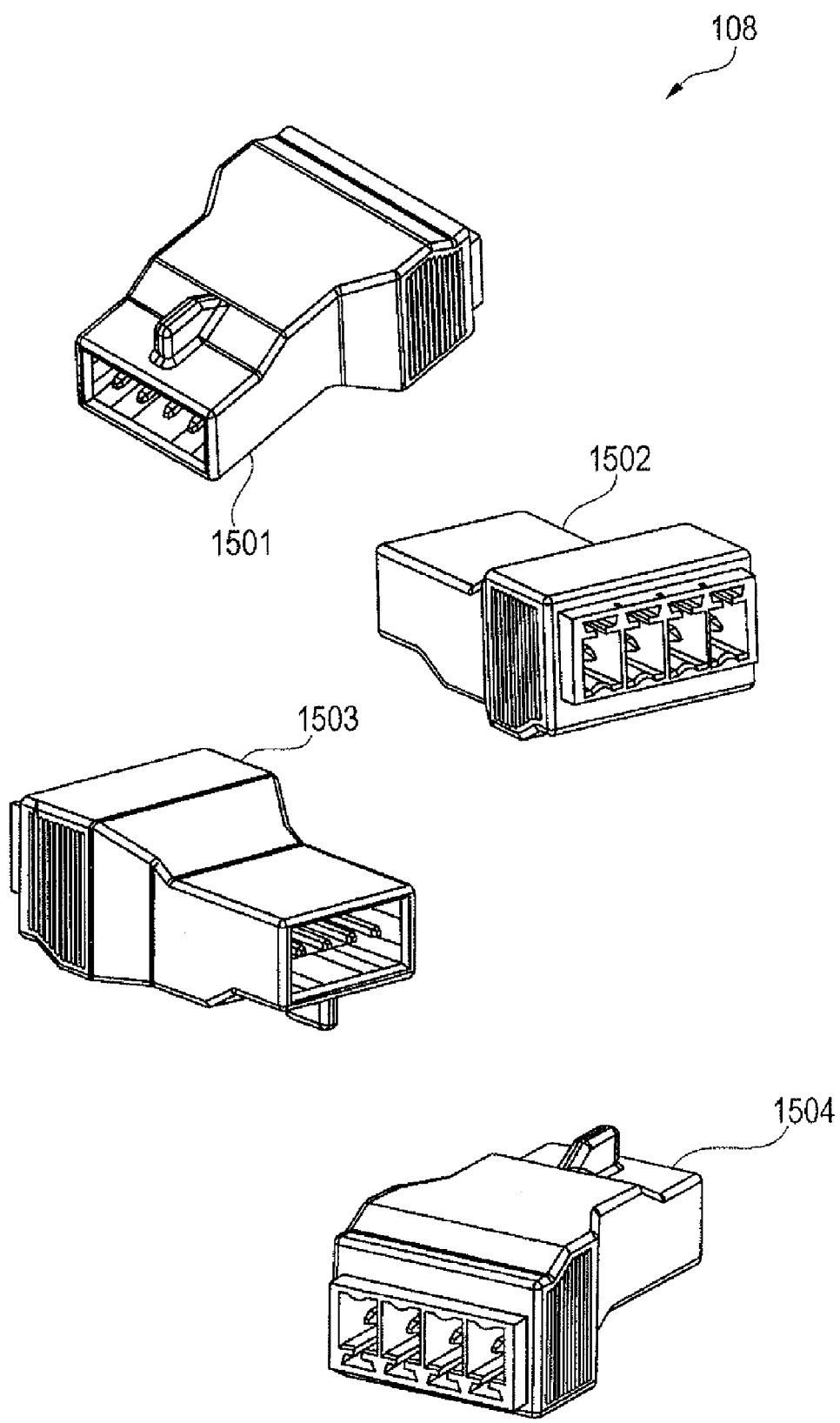
FIG. 15 shows four different perspective views of an adapter connector 108 according to an exemplary embodiment of the present invention.

FIG. 15 shows four different perspective views 1501, 1502, 1503, 1504 of an adapter connector 108 according to an exemplary embodiment of the present invention.

Figure 16:
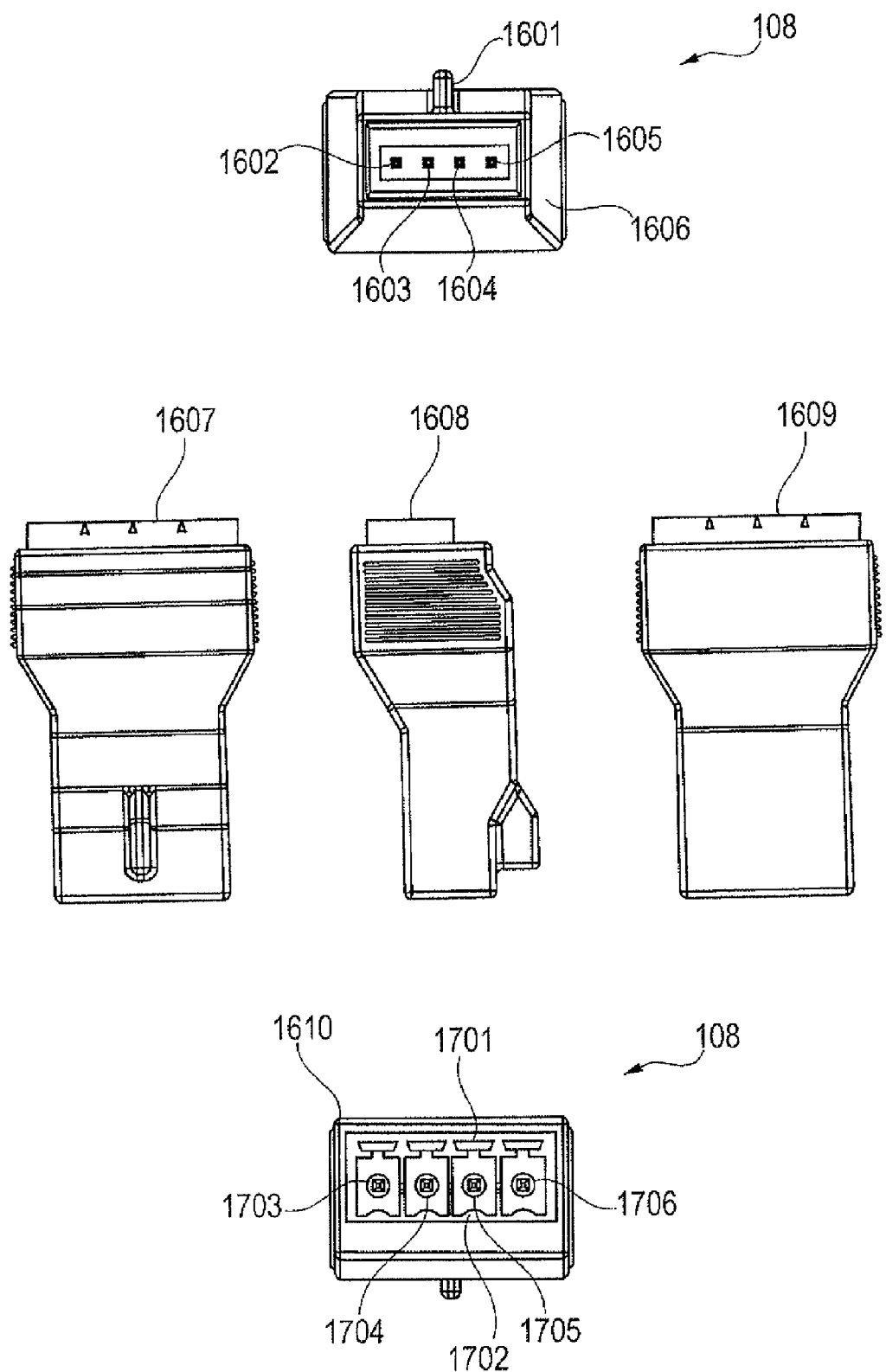
FIG. 16 shows four further diagrammatic views of the adapter connector of FIG. 15 according to an exemplary embodiment of the present invention.

FIG. 16 shows four further diagrammatic views of the adapter connector of FIG. 15. 1606 shows a front view, 1607, 1608, 1609 show three lateral views of the adapter connector 108 (from the top, from the side, and from below), while 1610 shows a rear view of the adapter connector 108.

On the front, the adapter connector 108 comprises various contact regions 1602, 1603, 1604, 1605 for connection to a series 50 field device. In order to prevent the adapter connector 108 from being plugged into the field device the wrong way round, for example a lug 1601 is provided.

1610 shows a diagrammatic rear view of the adapter connector 108. Here again, four connection regions 1703, 1704, 1705, 1706 are provided for connecting the adapter connector to an I²C connector of the I²C cable 202 of the connection box 100. Furthermore, here again an anti-rotation device is installed in the form of four dovetail-type or otherwise formed indentations 1701 on a first side, and four outward curvatures 1702 on a second side of the adapter connector 108. The outward curvatures 1701, 1702 can also comprise other forms, but they have to correspond to matching inward curvatures of a counter socket.

Figure 17:
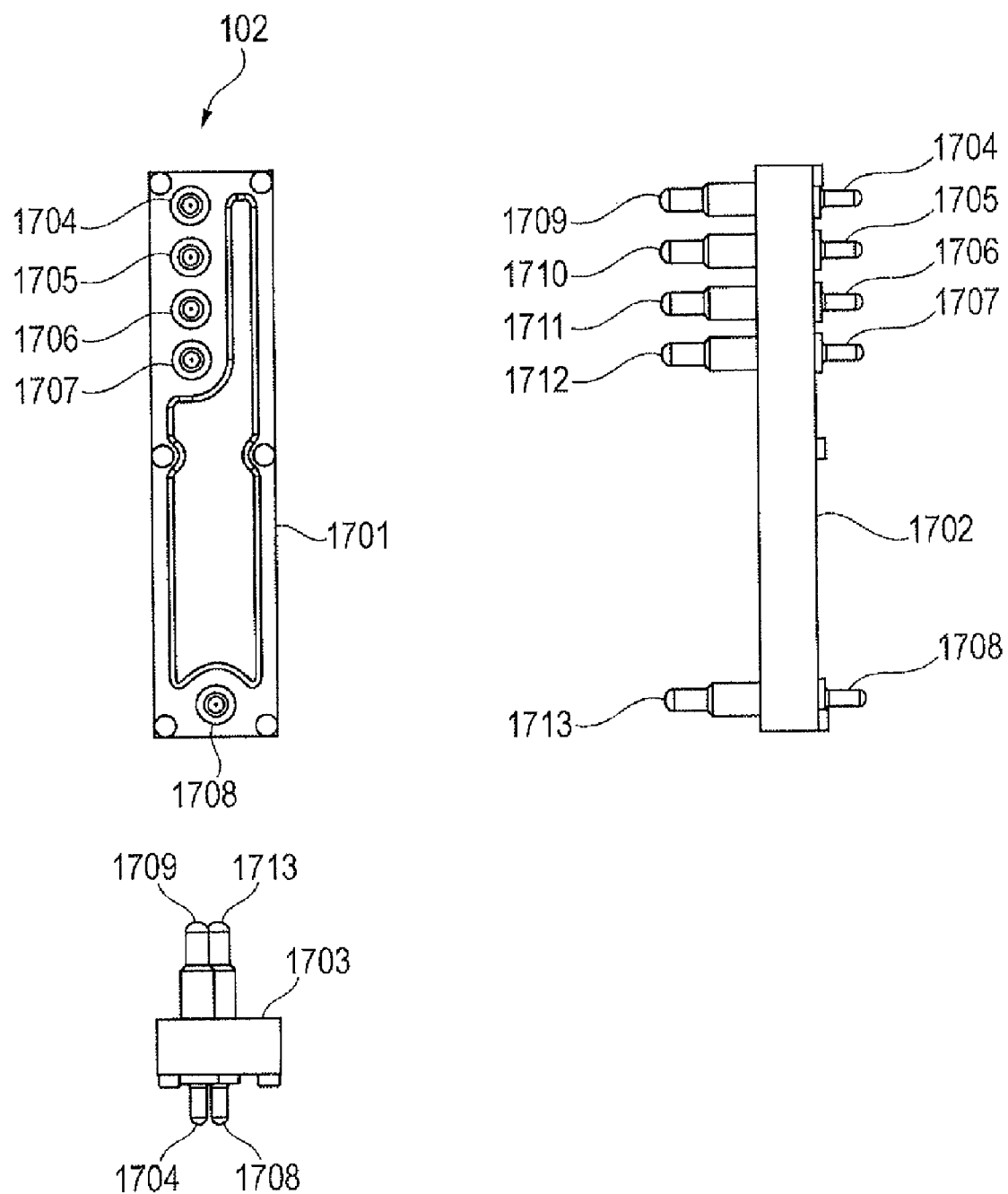
FIG. 17 shows three diagrammatic views of the interface connection with its sliding contacts or spring contacts according to an exemplary embodiment of the present invention.

FIG. 17 shows three diagrammatic views of the interface connection 102, 1901 with its spring contacts 1704, 1705, 1706, 1707, 1708 and 1709, 1710, 1711, 1712, 1713.

Diagram 1701 shows the underside of the interface connection 102, 1901; diagram 1702 shows a lateral view; while 1703 shows a front view.

The eight contact pins 1704 to 1713 are each coupled to corresponding spring elements (not shown in FIG. 17) and can at least partly be pushed (against the spring forces) into the base body of the interface connection 102. When an interface adapter 103 is screwed onto the connection box 100, the upper contact pins 1709 to 1713 are pressed against corresponding contact surfaces of the interface adapter 103 so that a good electrically conductive contact is established.

Figure 18:
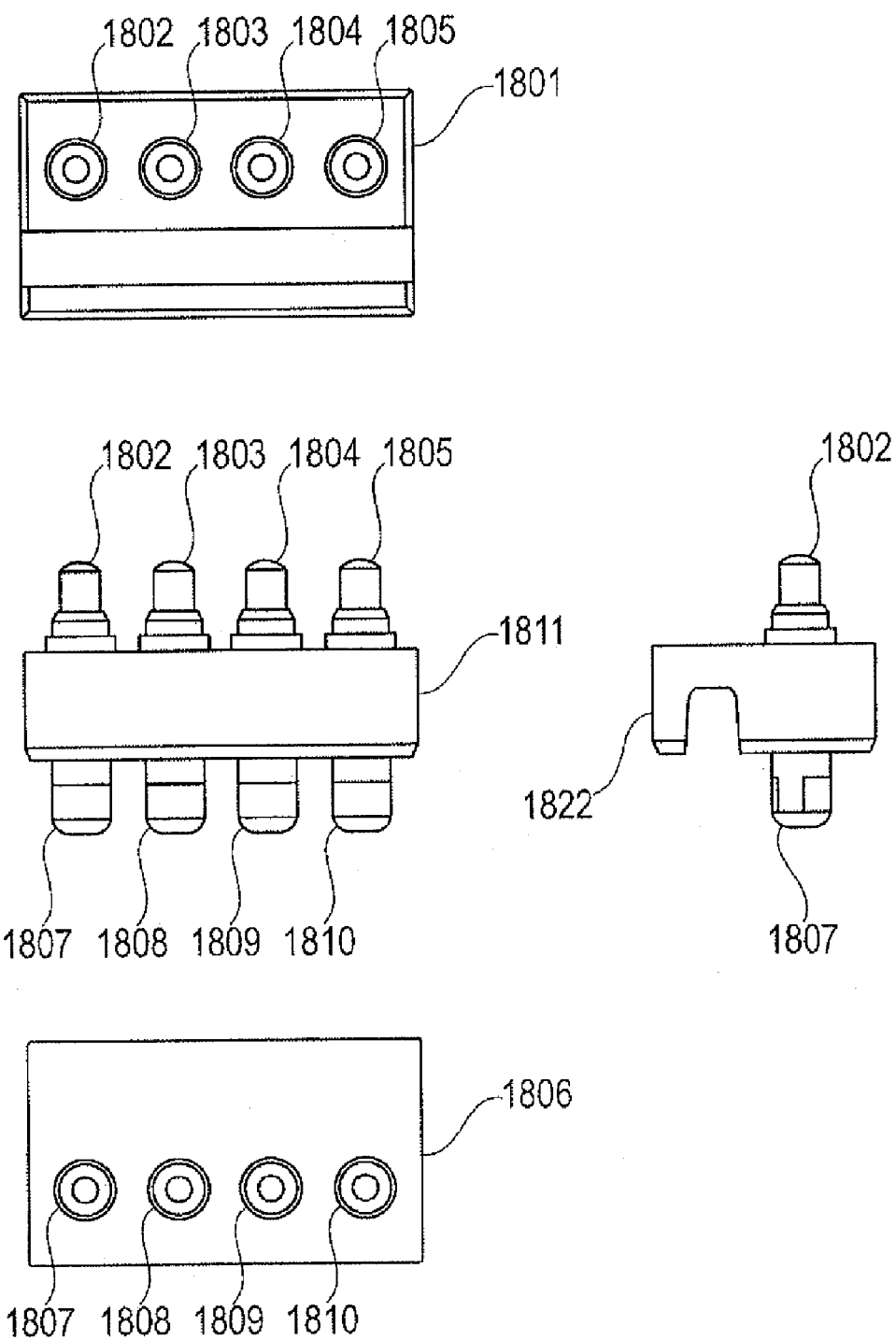
FIG. 18 shows a diagrammatic detailed view of spring contacts of the sensor according to an exemplary embodiment of the present invention.

FIG. 18 shows a diagrammatic detailed view of the spring contacts 102, 1901 of the sensor 109. 1801 shows a top view of the contacts 1802, 1803, 1804, 1805. 1806 shows a top view of the contacts 1807, 1808, 1809, 1810. 1811 shows a first lateral view of the spring contacts, and 1822 shows a second lateral view of the spring contacts with the direction of view being offset by 90°.

The spring contacts comprise, for example, spring elements, by means of which the contact pins 1802 to 1805 or 1807 to 1810 are pressed against the corresponding contact surfaces when the interface adapter 103 is screwed into the connection box 100.

Figure 19:
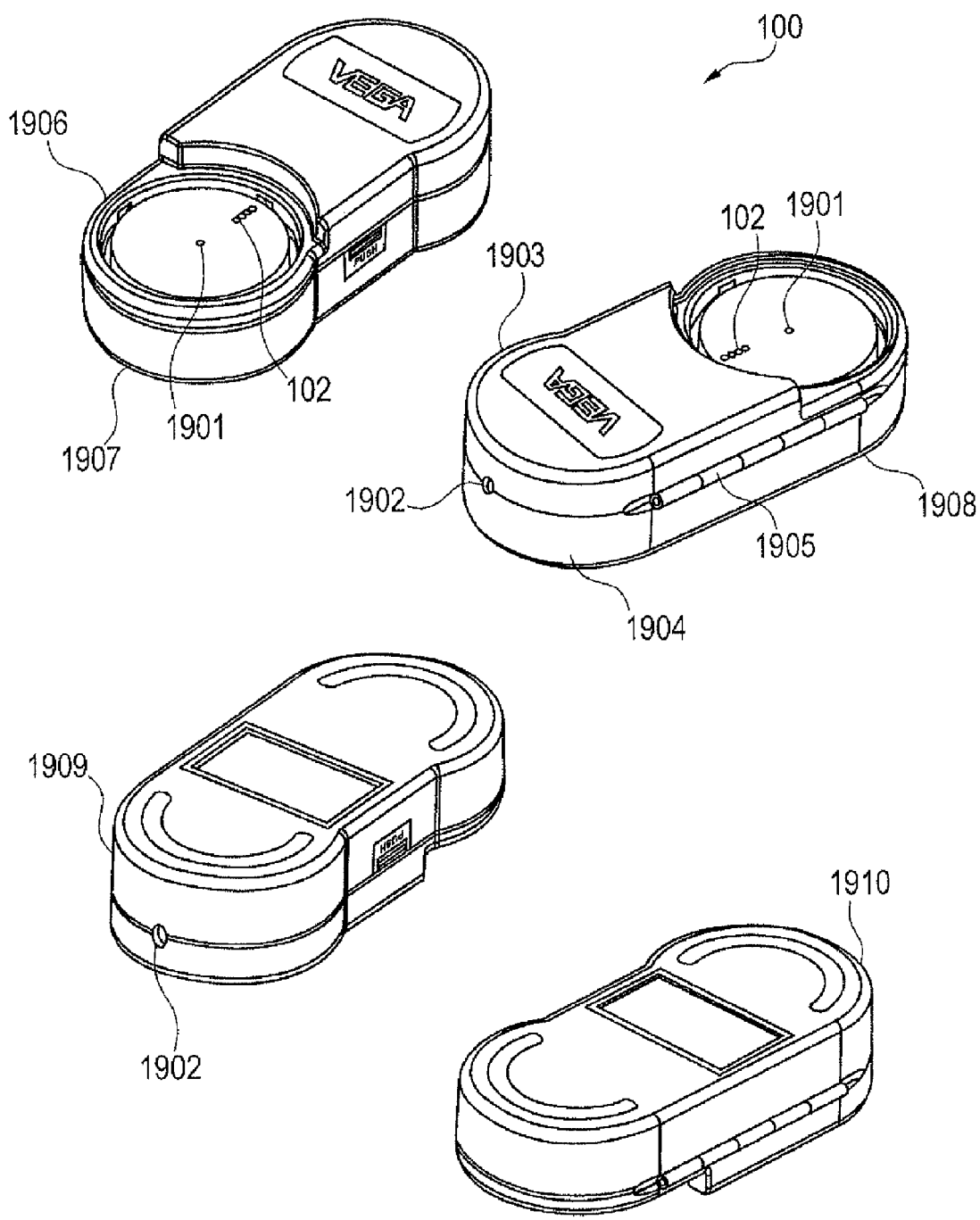
FIG. 19 shows a diagrammatic view of the connection box, seen from four different directions, according to a further exemplary embodiment of the present invention.

FIG. 19 shows a diagrammatic view 1907, 1908, 1909 of the connection box 100, seen from four different directions. The connection box 100 comprises a connection region 1906 for accommodating an interface adapter 103. In order to connect the interface adapter 103 to the connection box, interface connections 102, 1901 are provided, which are, for example, designed in the form of spring contacts. The interface connections 102 are used to transmit an PC signal, while the interface connection 1901 (in combination with one of the interface connections 102) is used to transmit a HART signal.

Furthermore, the box 100 comprises a cable leadthrough 1902, through which the HART line 105 or the I²C bus cable 106 can be fed. The box 100 comprises a cover element 1903 and a base element 1904, which are interconnected by way of a hinge 1905 so that the box 100 can be hinged open.

Figure 20:
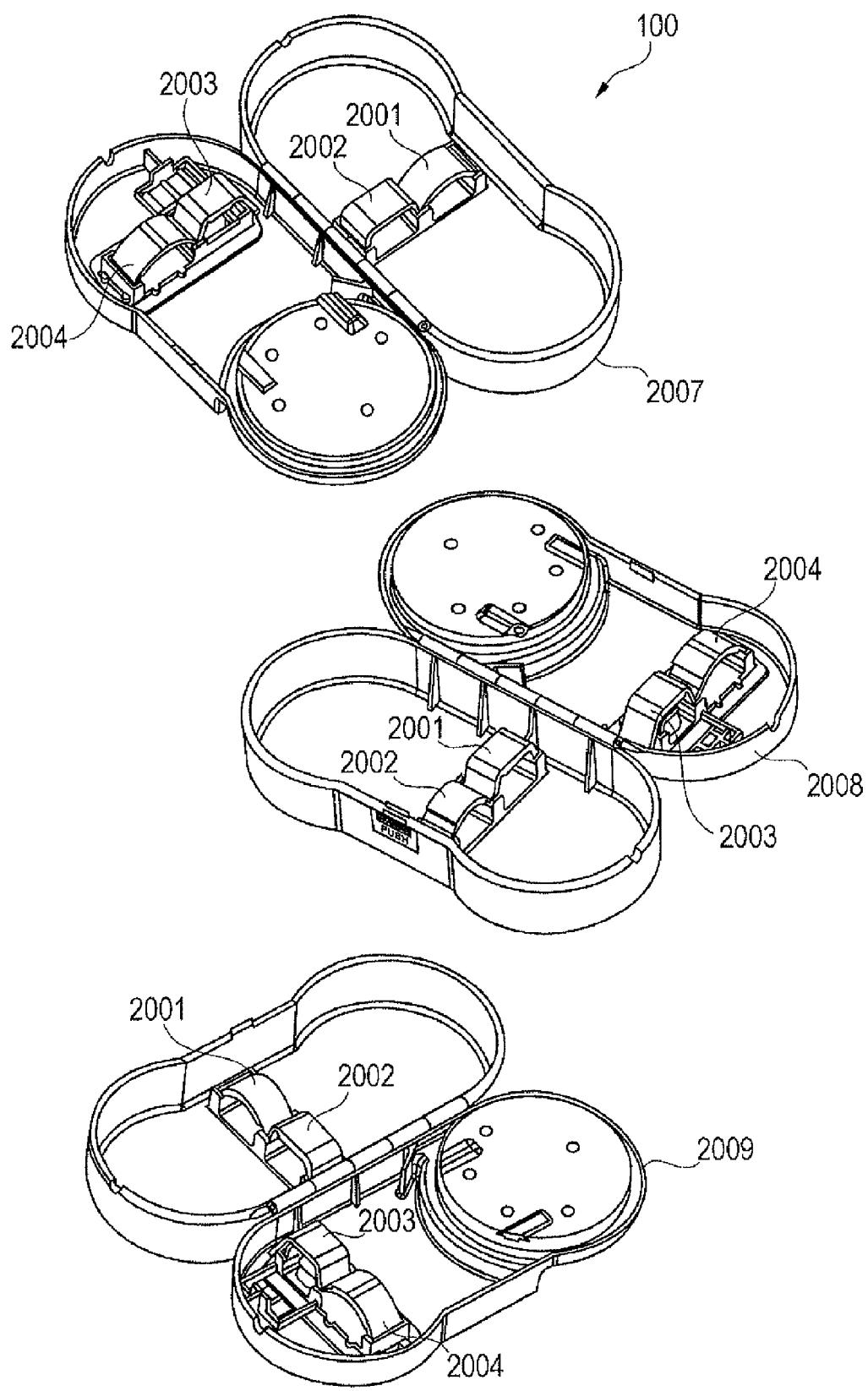
FIG. 20 shows three further perspective views of the connection box 100, in the hinged-open state, according to an exemplary embodiment of the present invention.

FIG. 20 shows three further perspective views 2007, 2008, 2009 of the connection box 100 in its hinged-open state. Holding elements 2001, 2002, 2003, 2004 are provided in order to accommodate the corresponding connecting cables 105, 106, 107 and the adapter connector 108.

Figure 21:
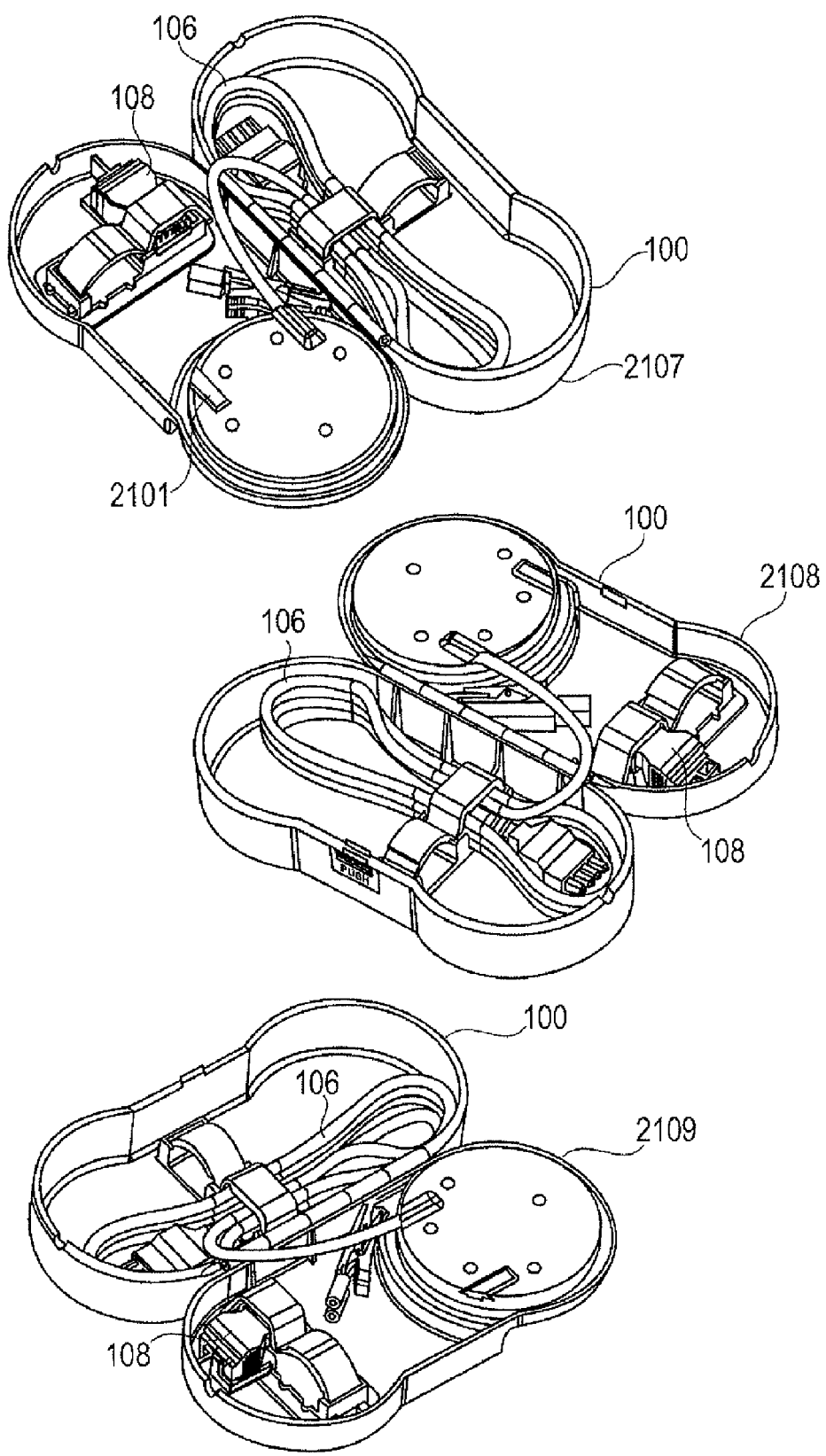
FIG. 21 shows three further perspective views of the connection box and an I²C bus cable as well as a connector, according to an exemplary embodiment of the present invention.

FIG. 21 shows three further perspective views 2107, 2108, 2109 of the connection box 100, comprising an I²C bus cable 106 and a connector 108.

Furthermore, a HART cable 105 (not shown in FIG. 21) can be provided which, for example, comes out of the bush 2101 and makes possible the connection to a HART line of a field device.

Figure 22:
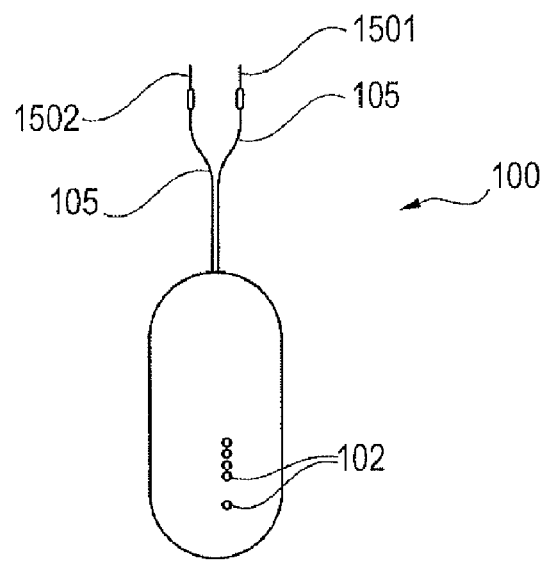
FIG. 22 shows a diagrammatic view of a connection box according to an exemplary embodiment of the present invention.

FIG. 22 shows a diagrammatic view of a connection box 100 according to a further exemplary embodiment of the present invention. The connection box 100 comprises spring contacts 102 for connection to an interface adapter. FIG. 17 shows a detailed view of the spring contacts 102. Furthermore, the connection box 100 comprises a HART cable 105, which provides a field device connection 101. The HART cable 105 comprises two connections 1501, 1502, which are, for example, designed in the form of terminals or connectors. The HART cable 105 can be connected to a field device by way of these two connections 1501, 1502.

Figure 23:
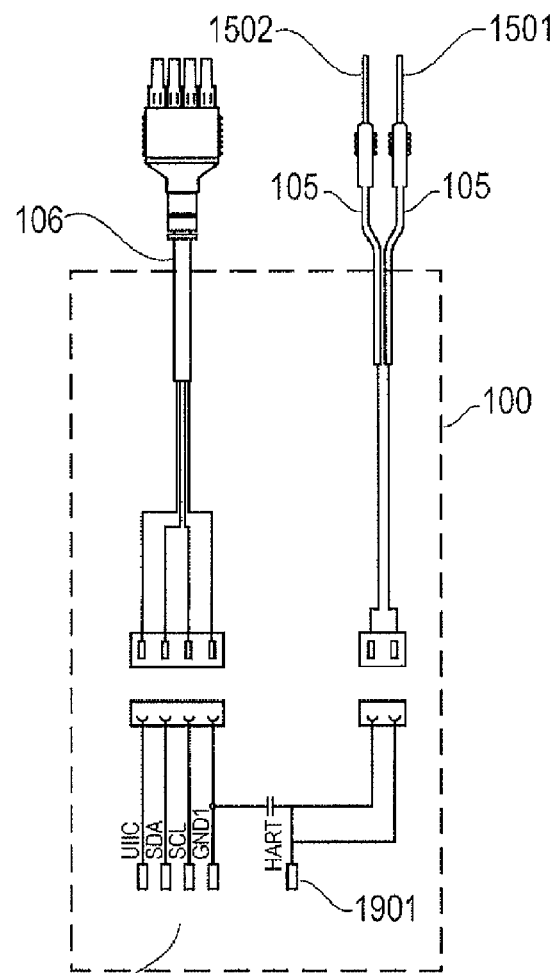
FIG. 23 shows a further diagrammatic view of a connection box according to an exemplary embodiment of the present invention.

FIG. 23 shows a further diagrammatic view of a connection box 100 with a HART cable 105 comprising the two connectors 1501, 1502, and with an PC cable 106. Furthermore, the interface connections 102 and 1901 are provided.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

What is claimed is:

1. A connection box for a wireless transmission of a signal between a field device and a control device, comprising:
   a radio interface at least one of (a) wirelessly transmitting of a transmit signal to the field device and (b) wireless receiving a receive signal from the field device; and
   an interface connection connecting the connection box to an interface adapter,
   wherein the radio interface and the interface connection are coupled to each other to transmit the receive signal from the radio interface to the interface connection and wherein the field device is at least one of a fill-level measuring device and a pressure measuring device,
   wherein the connection box is configured to tap a data line between the field device and an evaluation/display device, the connection box further comprising a hollow space accessible from an outside that accommodates at least one of a HART cable, an I²C bus cable, and a USB cable for tapping the data line between the field device and the evaluation/display device, and
   wherein the connection box is further configured to tap a radio link between the field device and the evaluation/display device.

2. The connection box according to claim 1, wherein the signal is selected from a group comprising a HART signal, an I²C signal, a Profibus signal, a Fieldbus foundation signal, a 4 . . . 20 mA signal and a switching signal.

3. The connection box according to claim 1, wherein the radio interface is an internal interface within the connection box.

4. The connection box according to claim 1, wherein the radio interface comprises an antenna having predeterminable antenna characteristics.

5. The connection box according to claim 1, wherein the radio interface operates at a predeterminable frequency of one of 900 MHz and 2.4 GHz.

6. The connection box according to claim 1, further comprising:
a field device connection connecting the box to the field device, wherein the field device connection and the interface connection are coupled together to transmit the signal.

7. The connection box according to claim 6, wherein the field device connection connects to a HART line.

8. The connection box according to claim 6, wherein, the field device connection includes a HART cable with two connectors in order to connect to the HART line.

9. The connection box according to claim 6, wherein the field device connection connects to an PC bus.

10. The connection box according to claim 9, wherein the field device connection comprises an I$^2$C bus cable to connect to the I$^2$C bus.

11. The connection box according to claim 1, wherein the interface connection connects the connection box directly to a display- and control device.

12. The connection box according to claim 11, wherein the display- and control device is a PLICSCOM device.

13. The connection box according to claim 1, wherein the field device connection comprises an adapter connector connecting to a series 50 device.

14. The connection box according to claim 13, wherein the adapter connector is coded such that incorrect connection of the adapter connector to the series 50 device is prevented.

15. The connection box according to claim 1, wherein the connection box transmits the signal from the control device to the field device and wherein the signal comprises parameterisation data for parameterizing the field device.

16. The connection box according to claim 1, wherein the connection box transmits the signal from the field device to the control device and wherein the signal comprises measuring data of the field device.

17. The connection box according to claim 1, further comprising:
an energy supply self-sufficiently supplying electrical energy to the interface adapter.

18. The connection box according to claim 17, wherein the energy supply comprises a rechargeable battery and a solar cell module, the solar cell module charging the rechargeable battery.

19. The connection box according to claim 1, wherein the interface connection comprises sliding contacts connecting the box to the interface adapter.

20. The connection box according to claim 1, further comprising:
a second interface connection connecting the box to a control device.

21. The use of a connection box for at least one of (a) fill level measuring and pressure measuring and (a) a wireless transmission of a signal between a field device and a control device,
wherein the connection box including (1) a radio interface at least one of (a) wirelessly transmitting of a transmit signal to the field device and (b) wireless receiving a receive signal from the field device; and (2) an interface connection connecting the connection box to an interface adapter,
wherein the radio interface and the interface connection are coupled to each other to transmit the receive signal from the radio interface to the interface connection, and
wherein the field device is at least one of a fill-level measuring device and a pressure measuring device,
wherein the connection box is configured to tap a data line between the field device and an evaluation/display device, the connection box further comprising a hollow space accessible from an outside that accommodates at least one of a HART cable, an I$^2$C bus cable, and a USB cable for tapping the data line between the field device and the evaluation/display device, and
wherein the connection box is further configured to tap a radio link between the field device and the evaluation/display device.

22. A method for a wireless transmission of a signal between a field device and a control device using a connection box, comprising the steps of:
connecting the connection box to an interface adapter, the connection box includes a radio interface and an interface connection connecting the connection box to an interface adapter, the radio interface and the interface connection being coupled to each other to transmit the receive signal from the radio interface to the interface connection; and
at least one of wirelessly transmitting a transmit signal from the radio interface of the connection box to the field device and wirelessly receiving a receive signal from the field device in the radio interface,
wherein the field device is at least one of a fill level measuring device and a pressure measuring device,
wherein the connection box is configured to tap a data line between the field device and an evaluation/display device, the connection box further comprising a hollow space accessible from an outside that accommodates at least one of a HART cable, an I$^2$C bus cable, and a USB cable for tapping the data line between the field device and the evaluation/display device, and
wherein the connection box is further configured to tap a radio link between the field device and the evaluation/display device.

23. The method according to claim 22, further comprising the step of:
transmitting the receive signal from the radio interface to the interface connection and then onwards to the control device.

24. The method according to claim 22, further comprising the step of:
transmitting the transmit signal from the control device to the interface connection and then to the radio interface.

* * * * *